(12) United States Patent
Hoch et al.

(10) Patent No.: US 8,122,488 B2
(45) Date of Patent: Feb. 21, 2012

(54) MEDIA FILE DISTRIBUTION SYSTEM AND METHOD

(75) Inventors: Wojtek Hoch, Etobicoke (CA); John Heaven, Markham (CA)

(73) Assignee: Yangaroo, Inc., Richmond Hill, Ontario (CA)

( * ) Notice: Subject to any disclaimer, the term of this patent is extended or adjusted under 35 U.S.C. 154(b) by 1164 days.

(21) Appl. No.: 11/854,289

(22) Filed: Sep. 12, 2007

(65) Prior Publication Data

US 2008/0289006 A1 Nov. 20, 2008

Related U.S. Application Data

(60) Provisional application No. 60/938,892, filed on May 18, 2007.

(51) Int. Cl.
*G06F 15/16* (2006.01)
*G06F 7/04* (2006.01)
*H04H 60/33* (2008.01)
*G06Q 30/00* (2006.01)
*G06F 17/30* (2006.01)
*H04L 12/58* (2006.01)
*G01R 31/08* (2006.01)
*G06F 15/177* (2006.01)

(52) U.S. Cl. .............. 726/4; 726/2; 725/10; 707/709; 705/14.1

(58) Field of Classification Search .............. 726/4, 2; 725/10; 707/9; 705/14
See application file for complete search history.

(56) References Cited

U.S. PATENT DOCUMENTS

| 7,716,710 | B1* | 5/2010 | Everson et al. ............... 725/110 |
| 2004/0015445 | A1 | 1/2004 | Heaven et al. |
| 2006/0190455 | A1* | 8/2006 | Braddy et al. .................... 707/9 |
| 2006/0218222 | A1 | 9/2006 | Brahmbhatt et al. |
| 2007/0016655 | A1 | 1/2007 | Goodman et al. |
| 2007/0061863 | A1* | 3/2007 | Rajasekaran ..................... 726/2 |
| 2007/0124201 | A1* | 5/2007 | Hu et al. ......................... 705/14 |

FOREIGN PATENT DOCUMENTS

EP 1956775 A1 * 8/2008

OTHER PUBLICATIONS

María Elisa Bertinat, Daniel De Vera, Darío Padula, Franco Robledo Amoza, Pablo Rodríguez-Bocca, Pablo Romero, Gerardo Rubino; "GoalBit: the first free and open source peer-to-peer streaming network"; Sep. 2009; LANC '09: Proceedings of the 5th International Latin American Networking Conference; Publisher: ACM; pp. 49-59.*

* cited by examiner

*Primary Examiner* — Matthew Smithers
*Assistant Examiner* — Courtney Fields
(74) *Attorney, Agent, or Firm* — Boyle Fredrickson, S.C.

(57) ABSTRACT

A file distribution method and system for distributing media files to authorized recipients. The method and system exploit the advantages of peer-to-peer file distribution protocols, such as BitTorrent, while maintaining security and control over the file distribution. A server farm containing a plurality of servers is placed behind the security of a distribution system, preventing unauthorized client devices from accessing the media files stored on the server farm. Media files are fragmented and stored on each of the plurality of servers within the server farm. Each server on the server farm features at least one IP address and each server is pre-seeded with a complete copy of the fragmented media file. Fragments are distributed to requesting authorized clients in accordance with a peer-to-peer file distribution protocol.

19 Claims, 3 Drawing Sheets

MEDIA FILE DISTRIBUTION SYSTEM AND METHOD

CROSS-REFERENCE TO RELATED APPLICATIONS

This application claims the benefit of U.S. Provisional Application Ser. No. 60/938,892, filed May 18, 2007.

FIELD OF THE INVENTION

The present invention relates to electronic file distribution systems and methods.

BACKGROUND OF THE INVENTION

The distribution of media over networks, including the Internet, is becoming commonplace. There are a number of systems and protocols dedicated to transferring media files over computer networks. In one sense this development has enabled creators of media greater control over the distribution process. In another sense, it has lead to more widespread infringement of copyright as media files are distributed by unauthorized persons without the permission of the copyright owner.

The security and timing of the release of media can be of vital importance to the developers of that material. The early unauthorized release of new music tracks, movies, or other media, has become a major problem for music labels and movie studios. Digital rights management schemes attempt to deter infringement by preventing users from playing unauthorized copies or by tracking the distribution of unauthorized copies of media files. However, some DRM strategies do not necessarily prevent unauthorized release and distribution of the media file. Accordingly, it is important to maintain security over the early distribution of such media.

A digital content distribution system and service, marketed under the trade-mark DMDS™ by Musicrypt Inc., was developed to address the problems associated with controlling distribution of sensitive media files to a pre-selected list of recipients. Embodiments of the system are described in US patent publication no. 2004-0015445 A1, filed May 8, 2003 by Heaven et al.

Professional media users and developers are increasingly relying upon digital file distribution, which means that the media files distributed are of high quality, and thus, tend to be large. This is especially so with regard to video material. Accordingly, it would be advantageous to provide for an improved file distribution system and service with faster file download capability to accommodate the distribution of large media files.

SUMMARY OF THE INVENTION

The present application provides a novel file distribution method and system for distributing media files to authorized recipients. The method and system exploit the advantages of peer-to-peer file distribution protocols, such as BitTorrent, while maintaining security and control over the file distribution. A server farm containing a plurality of servers is placed behind the security of a distribution system, preventing unauthorized client devices from accessing the media files stored on the server farm. Media files are fragmented and stored on each of the plurality of servers within the server farm. Each server on the server farm features at least one IP address and each server is pre-seeded with a complete copy of the fragmented media file. Fragments are distributed to requesting authorized clients in accordance with a peer-to-peer file distribution protocol.

In one aspect, the present application provides a system for distributing a media file to a client over a computer network, the client having a download agent and being configured to request access to the media file over the computer network. The system includes a distribution server for receiving the request from the client and for authenticating the client. The distribution server is configured to provide the download agent with a torrent file associated with the media file provided the client has been authenticated. The system also includes a server farm containing a plurality of servers each having at least one IP address and each having been pre-seeded with a complete copy of the media file, which is stored on each of the servers, and an access control module between the server farm and the computer network and configured to restrict access to the plurality of servers to download agents associated with clients authenticated by the distribution server. Each of the plurality of servers includes a torrent application configured to receive a download request via its at least one IP address from the download agent and configured to transmit at least a fragment of the media file to the download agent in response to the download request.

In another aspect, the present application provides a method of distributing a media file to a client from a server farm via a computer network, the client having a download agent and being configured to request access to the media file over the computer network. The server farm contains a plurality of servers each having at least one IP address and each has a torrent application configured to receive a download request via its at least one IP address. The method includes steps of pre-seeding each of the plurality of servers with a complete copy of the media file, receiving the request for access from the client at a distribution server, authenticating the client as an authorized client entitled to have access to the media file, sending the download agent of the authorized client a torrent file associated with the media file if the client has been authenticated, receiving a download request from the download agent through at least one of the IP addresses at one of the content servers, and transmitting at least a fragment of the media file to the download agent in response to the download request.

In yet another aspect, the present application provides a computer-readable medium containing computer-readable instructions for configuring one or more computers to perform the steps of the method described herein.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

In the description that follows reference may be made to various elements or components of the described system that would be implemented, wholly or partly, through software. The terms "module", "component", "routine", or "application" may be used to describe functional software elements. It will be appreciated that the division of various software elements into functional blocks or components to aid in illustration and does not necessarily indicate that all embodiments would be so constructed. It will be appreciated that various software elements may be coded and implemented in combination. The following description is not intended to be limited to any particular software programming construct or programming language.

Figure 1:
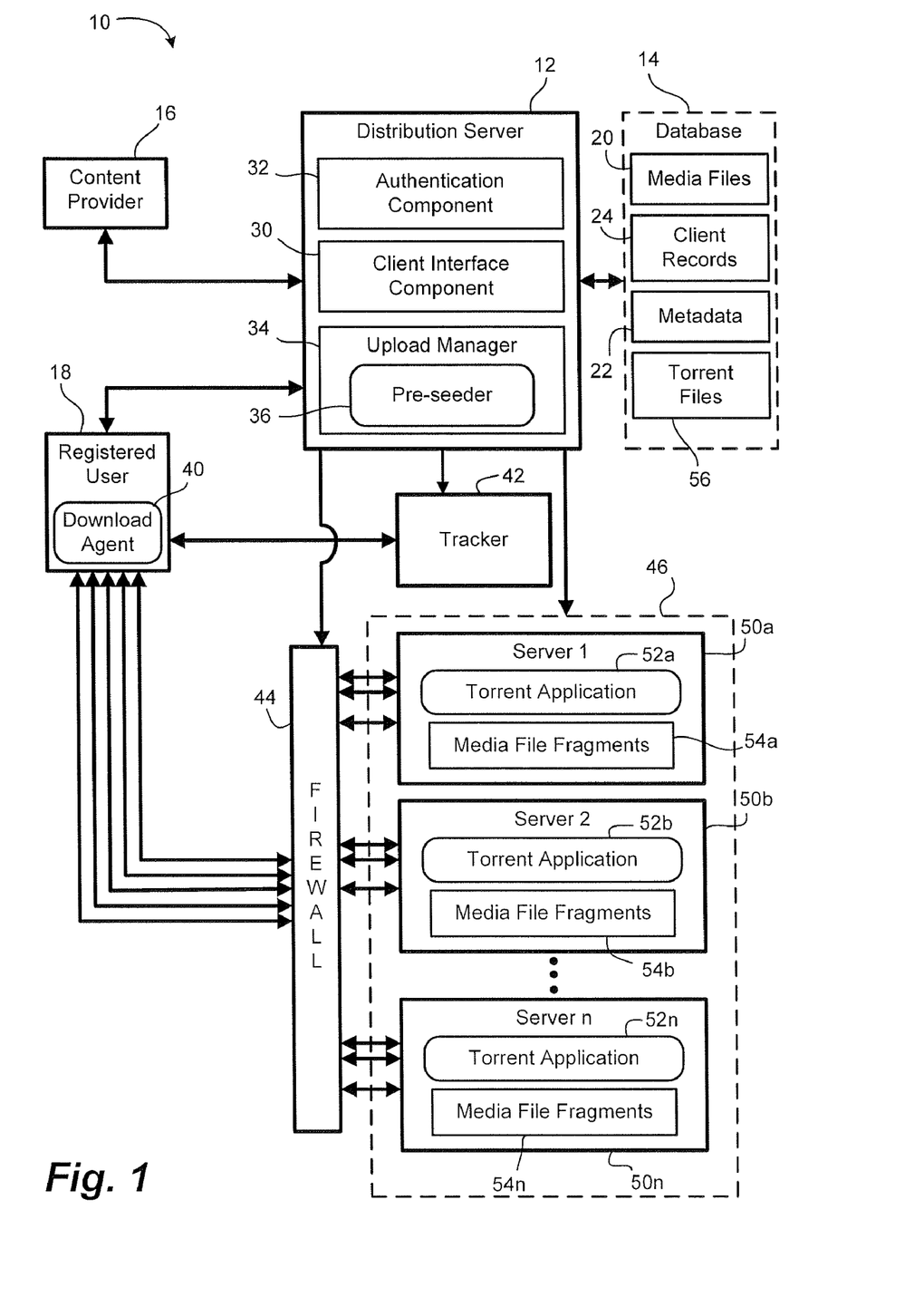
FIG. 1 shows, in block diagram form, a file distribution system.

Reference is first made to FIG. 1, which shows, in block diagram form, a file distribution system 10. The system 10 is configured to distributed media files to authorized clients upon request.

The system 10 includes a media distribution server 12. The media distribution server 12 manages the uploading of digital media by content providers and the downloading or streaming of digital media by recipients. The media distribution server 12 ensures appropriate encryption, authentication, and verification protocols are observed so as to ensure the distribution of the media is carefully controlled. One or more content providers 16 and one or more registered users 18 access the media distribution server 12 from remote devices. The remote devices communicate with the media distribution server 12 over one or more networks, which may include the Internet. In one embodiment, the media distribution server 12 includes an HTTP daemon or other such entity for receiving and responding to incoming requests from the remote devices. The media distribution server 12 may provide a Web interface for interacting with the remote devices 12.

An example of a media distribution server 12 is described in US patent publication no. 2004-0015445 A1 filed May 8, 2003, by Heaven et al., the contents of which are hereby incorporated by reference.

The media distribution server 12 includes a database 14 or other non-volatile digital storage. The database 14 includes media files 20 uploaded by one or more content providers. The media files 20 may be stored in encrypted or unencrypted format within the database 14. The media files 20 may include any manner of digital media content, including images, audio, video, or combinations thereof. Digital audio files may include sound recordings in the form of a single track, an album, or other compilations or excerpts of those. Digital video files may include video alone or audio and video. The digital video files may, in some embodiments, include music videos, television programs, movies, television advertisements, or video material of any other nature.

The database 14 further stores metadata 22 associated with each of the media files 20. In an example wherein one of the media files 20 is a musical recording, the metadata 22 may include artist information, length and format information, title information, album information, associated images, or other data regarding the track, the artist, and/or the recording studio, record label, etc. In some cases, the metadata 22 may include release conditions, such as time and date before which the media file 20 is not to be made available. The metadata 22 may, in some embodiments, be stored as a separate record or file from its associated media file 20, and the association between related media files 20 and metadata 22 may be maintained through a linked list or other mechanism. In another embodiment, the metadata is stored in a header or otherwise as part of the digital file or record containing the media content that makes up the media file 20.

The database 14 may also include client records 24 that contain information regarding the entities or individuals registered with the system 10. An example client record 24 may contain information regarding the registered user supplied during the registration process, such as name, company, and genres of interest. The client record 24 may also include verification data used to verify the identity of the registered user during a login process. In one embodiment, the verification data may include a login name and/or password. In another embodiment, the verification data may include biometric information, such as keystroke cadence data. Other types of verification data for authenticating the individual as being a registered user will be familiar to those of ordinary skill in the art.

The database 14 may include other data or metadata associated with registered users and/or media files 20. For example, there may be links between related media files 20, such as those recorded or created by the same artist or company, or those arranged as a compilation, such as an album or video. The types of links and associated information may depend on the nature of the media files 20.

Media files 20 are uploaded to the media distribution server 12 by one or more registered content providers 16. A content provider 16 may upload one or more media files 20 to the media distribution server 12 to enable distribution of the media files 20 to third parties. In one embodiment, the distribution of the media files 20 is restricted to one or more registered users 18, as selected by the content provider 16. The registered users 18 entitled to access a particular media file 20 is pre-selected by the content provider 16 and a distribution list containing authorized recipients is maintained by the media distribution server 12 in association with the particular media file 20. For example, in one embodiment the content provider 16 selects authorized recipients from a list of registered users 18 and the selected recipients form the distribution list. In another embodiment, the content provider 16 may select one or more pre-arranged distribution lists each of which contains a subset of the registered users 18. For example the pre-arranged distribution lists may include all registered users 18 within a given industry, geographical area, or who have expressed an interest in a particular category or genre of media. Other examples will be appreciated by those skilled in the art.

In one embodiment, the distribution list may be stored in the database 14 in association with the particular media file 20. Additional details of an example embodiment of such a media distribution service are described in US patent publication no. 2004-0015445 A1 filed May 8, 2003, by Heaven et al., the contents of which are hereby incorporated by reference.

A registered user 18 may seek access to the media files 20 through the media distribution server 12. The media distribution server 12 includes a client interface component 30 for providing an interface to a registered user 12. The client interface component 30, in many embodiments, provides a mark-up language based Web interface. Through the Web interface, the registered user 18 may be prompted to login or otherwise verify his or her identity. The media distribution server 12 may include an authentication component 32 for receiving and verifying login and/or password data and for authenticating the input data as valid. For example, the authentication component 32 may verify that the login name and password are valid, that other input data is valid, that biometric data matches stored data associated with the login name, and/or other authentication processes. The range of authentication processes that may be employed to verify the identity of the registered user will be appreciated by those ordinarily skilled in the art.

Subsequent requests and communications from a registered user 18 that has been authenticated by the authentication component 32 may be associated with the registered user 18 through a session management protocol. For example, upon authentication, the registered user's web browser may receive a session token. The session token may be transmitted from the media distribution server 12 to the registered user 18 within a URL, within a HTTP header, within an HTML document, or otherwise. The web browser or similar application operating at the registered user 18 stores the session token and resends the session token to the media distribution server 12 with each new HTTP request. Those skilled in the art will appreciate that there are a range of possibilities available for implementing session management to ensure communications received by the media distribution server 12 originate from an authenticated registered user 18.

Once a user has been authenticated as a registered user 18, then the registered user 18 is provided with access to a portion of the database 14. For example, subject to release conditions or other restrictions, the registered user 18 may be provided with a list of media files 20 available for download by the registered user 18. The list of available media file 20 displayed may be restricted to files for which the registered user is an authorized recipient, as specified in the associated distribution lists. In some cases, the registered user 18 may be entitled to stream a sample of a video or audio file to determine whether he or she wishes to download the entire media file 20.

In some embodiments, the media distribution server 12 may send a notification, such as by instant message, e-mail, or otherwise, to registered users 18 listed in a distribution list for a given media file 20 announcing that the media file 20 is available for download. In another embodiment, an announcement of newly available media files 20 or announcements regarding upcoming release dates may be included in a regular periodical newsletter-format e-mail, which in some cases may include content tailored to the individual registered users 18 based upon the media files 20 to which they are entitled access.

The media distribution system 12 is configured to receive a request from a registered user 18 for one of the media files 20. This may occur through user selection of a download button or other icon within a web interface that is displayed in association with the selected media file 20.

Some media files 20 can be very large and may require a significant time to download using conventional file transfer protocols. For example, large files may result from lengthy video files, such as movies, or from particularly high quality media, such as broadcast quality or high-definition broadcast quality video, even when relatively short in run-time duration. Accordingly, the present system 10 provides for a novel file distribution method and architecture.

The system 10 exploits characteristics of BitTorrents. BitTorrent is a peer-to-peer file distribution protocol developed to distribute large data files widely amongst a large number of users. The protocol and its associated free software implementation was originally developed by Bram Cohen and is implemented in software currently offered by BitTorrent, Inc. The BitTorrent protocol is typically associated with peer-to-peer file distribution over the Internet for the (usually) unauthorized and unregulated distribution of copyrighted media.

BitTorrent operates by dividing a media file into a number of fragments, often as small as 256 kB. The media file has an associated torrent file that contains metadata about the media file, its fragments, and, typically, the address of a tracker. The tracker maintains lists of clients participating in a torrent, i.e. which "peers" are in the "swarm". In other words, the tracker knows the addresses of those devices that contain one or more of the fragments of the media file. Peers are an instance of a BitTorrent client on device connected to the network to which other peers may connect. A "seeder" is a peer that has a complete copy of the media file and still offers access to the file. Initially, there is typically one seeder that has the initial copy of the file that is being made available. As peers begin to join the swarm and request pieces of the media file from the one seeder, they too become sources for other peers insofar as they have some fragments of the file. Accordingly, initially the file distribution starts slowly since there is a single source for all fragments. As the swarm grows with additional peers joining, the download speed for new peers and those still downloading increases. In many implementations, peers download fragments of the file in random order to increase the chances that two peers will have different pieces of the file that may then be exchanged. In some cases, the BitTorrent protocol may be implemented without a formal "tracker" or with distributed tracking. In this type of implementation, each peer in the swarm acts as a tracker. There are a number of different variations and implementations of the basic BitTorrent protocol.

The system 10 described herein exploits aspects of the BitTorrent protocol to enable accelerated download capability for large files, yet maintains all the security and integrity over distribution of the media files 20 expected by the content providers 16.

The system 10 includes a server farm 46. The server farm 46 includes a plurality of servers 50 (shown individually as 50a, 50b, . . . , 50n). Each of the servers 50 has at least one IP address assigned to it. In one embodiment, each of the servers 50 has more than one IP address, thereby causing each server 50 to appear to external clients as more than one source for the media file. Although the embodiment(s) described below assume more than one IP address per server 50, it will be understood that in some embodiments one or more of the servers 50 may have one IP address assigned.

Each of the servers 50 includes a copy of all fragments of the media file(s) 20. In other words, each server 50 includes a memory storing media file fragments 54 (shown individually as 54a, 54b, . . . , 54n). As will be described below, the servers 50 are pre-populated with a complete copy of the media file(s) 20, i.e. all the constituent fragments 54.

The media distribution server 12 includes an upload manager 34 for managing the receipt of media files 20 and associated metadata 22 from content providers 16 during an upload process. The upload manager 34 may be configured to perform encryption, decryption, and other packaging and/or storage operations to prepare the received media file 20 for storage in the database 14.

The media distribution server 12 further includes a pre-seeder module 36 for distributing an uploaded media file 20 to the servers 50 within the server farm 46. In one embodiment, the media file 20 is first fragmented by the pre-seeder module 36 and the pre-seeder module 36 sends the fragments to the servers 50. The pre-seeder module 36 further generates a torrent file 56 associated with the media file 20. The torrent file 56 may be stored within the database 16 in association with the media file 20. The torrent file 56 contains metadata regarding the media file, its fragments, and other data to facilitate a BitTorrent download process. In one embodiment, the pre-seeder module 36 performs its functions in connection with an upload process.

Although it is shown as a part of the upload manager 34, the pre-seeder module 36 may be implemented separately from the upload manager 34 as a part of another software component or as a standalone component. The range of implementation options will be appreciated by those skilled in the art.

The system 10 further includes a tracker 42. The tracker 42 may be implemented on the same machines or system as the media distribution server 12 or on a separate machine or system. The tracker 42 maintains data regarding the media files available for download from the server farm 46. In particular, the tracker 42 includes data regarding the IP addresses associated with each of the servers 50.

Each of the servers 50 implements a torrent application 52 (shown individually as 52a, 52b, . . . , 52n) for receiving and responding to requests from registered users 18 for a media file fragment. The torrent application 52 manages the sending of the media file fragments 54.

The registered user 18 includes a download agent 40. The download agent 40 implements a BitTorrent client. The download agent 40 is configured to obtain the address of the tracker 42 from the torrent file 56 and to transmit a request for the media file to the tracker 42. The tracker 42 is configured to respond to the request by providing the download agent 40 with the IP addresses of the servers 50 in the server farm 46 pre-populated with the file. To the download agent 40, the multiple servers 50 each with multiple IP addresses appears as a large swarm, and the download agent 40 then initiates download requests in accordance with the BitTorrent protocol, or variations thereon. For example, the download agent 40 may begin by requesting a random one of the fragments 54 of the media file from one of the servers 50 through one of its IP addresses. Subsequent requests for the remaining fragments 54 may be directed to the same IP address, a different IP address on the same server 50, or to other IP addresses on other servers, depending on the precise implementation of the BitTorrent protocol used. In some embodiments, the download agent 40 may rely on information from the tracker 42 or from the torrent applications 52 themselves regarding the download speeds available from each IP address so as to determine where to direct requests for fragments 54.

The system 10 also includes an access control module 44 for protecting the security of the server farm 46. In some embodiments, the access control module 44 may be implemented using a firewall. The access control module 44 ensures that incoming requests for fragments 54 originate from registered users 18 that have been authenticated by the authentication component 32. In other words, the access control module 44 ensures that the servers 50 remain under the blanket of security imposed by the media distribution server 12. Any requests for fragments 54 or other requests for access received by the access control module 44 from an unauthorized source may be refused.

Accordingly, in one embodiment, the download agent 40 of an authorized registered user 18 may be configured to forward the session token or other evidence of authentication with each request for a fragment 54. The authentication component 32 may send session token data or other such authentication data to the access control module 44 when registered users are authenticated so that the access control module 44 has up-to-date authentication data against which to evaluate incoming requests. A request that does not contain authentication data that can be verified by the access control module 44 is not forwarded to the server farm 46.

In another embodiment, there is a technical distinction between the web browsing phase of selecting media files and the actual downloading phase that necessitates a second login process. When a registered user 18 selects a file for download from the media distribution server 12 through his or her web browser using the web interface of the server 12, the associated torrent file 56 is queued for download to the authorized registered user 18, but is not immediately sent. The user is then prompted to log into the download agent 40 separately. The download agent 40 may be wholly separate from the web browser or may operate as a plug-in to conventional web browsers. On initialization, the download agent 40 prompts the user for login information in the same manner as the authentication component 32. The download agent 40 is configured to send the input login information to the media distribution server 12 and, in particular, to the authentication component 32 for authentication. The media distribution server 12 thus authenticates the download agent 40. As set out above, session tokens or other such session management mechanisms may be used to determine that subsequent requests are received from the same download agent 40. Once the download agent 40 has been authenticated, the media distribution server 12 may be configured to send the queued torrent file 56 to the download agent 40, whereupon the download agent 40 may obtain the tracker address form the torrent file 56. As with other embodiments, the access control module 44 may be provided with session token or other authentication data regarding currently authenticated download agents 40 in order to recognize valid incoming requests for access to the server farm 46.

Figure 2:
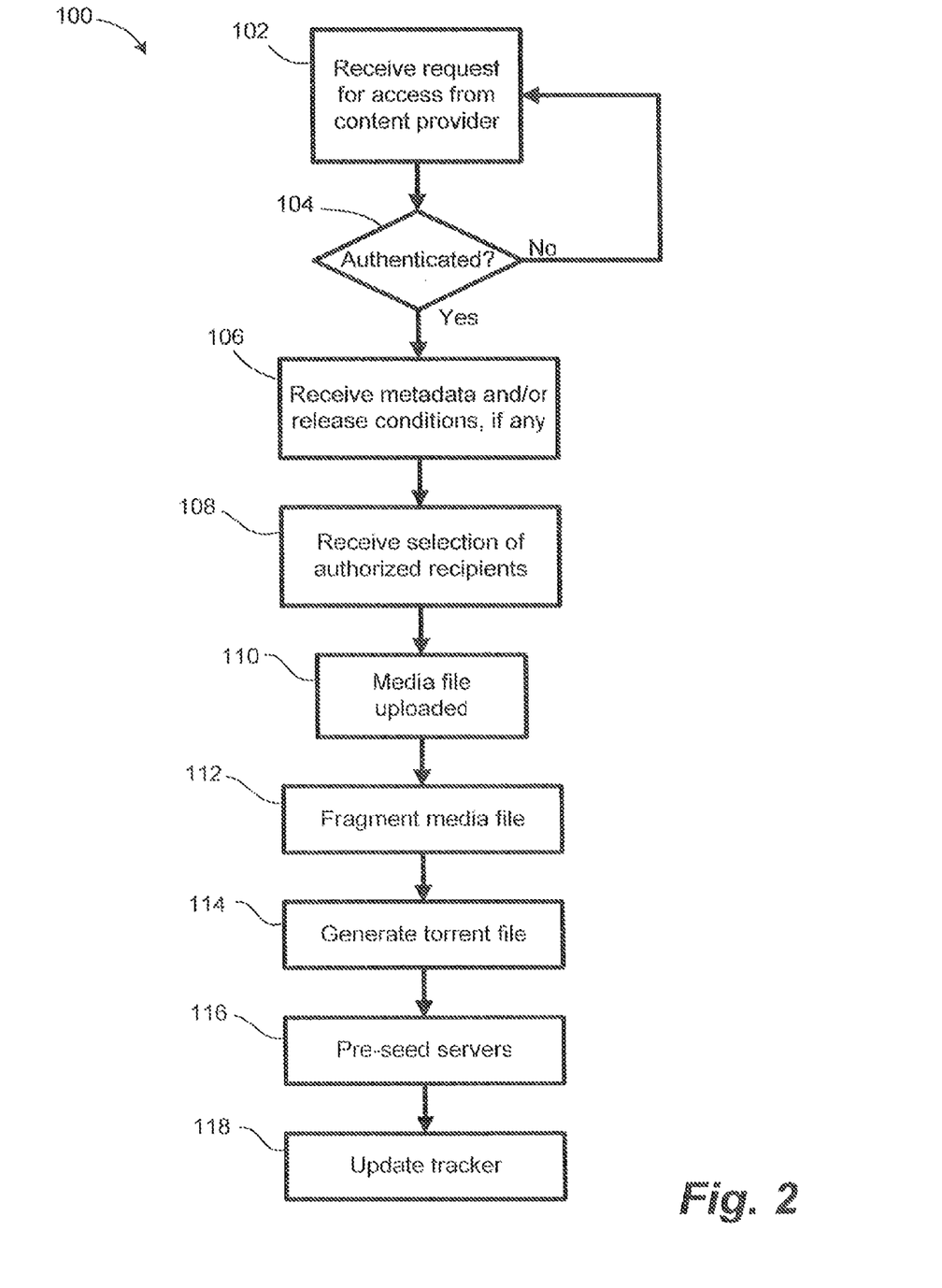
FIG. 2 shows, in flowchart form, a method for receiving a media file for distribution.

Reference is now also made to FIG. 2, which shows, in flowchart form, a method 100 for receiving a media file for distribution. It will be apparent from the following description that the method 100 may be implemented, partly or wholly in software, upon the media distribution server 12. Portions of the method 100 may be implemented by the client interface component 30, the authentication component 32, the upload manager 34, the pre-seeder module 36, or other software elements.

The method 100 begins in step 102 with receipt of a request for access to the system 10 from a content provider 16. The request may be received through the client interface component 30, such at through a Web portal. The request for access triggers an authentication routine for confirming that the content provider 16 is registered with the system 10. The system 10 determines whether the content provider 16 is authorized to have access at step 104. It will be appreciated that an unregistered content provider may, in some embodiments, be prompted to undergo a registration process to become a registered content provider. The authentication routine may solicit input from the content provider, such as a login name, password, or other information, from which the authentication component 32 may determine if the content provider has authorized access. In some embodiments, the authentication component 32 may employ biometric techniques for authenticating the identity of the content provider, such as evaluating keystroke timing data. It will be appreciated that other techniques for authenticating a user requesting access to over a network may also be used.

Once the content provider 16 has been granted access to the system 10, the client interface component 30 may make available various operations or functions of the system 10. For example, the content provider 16 may be permitted to review existing media the content provider 16 has uploaded to the system 10. The content provider 16 may be permitted to edit release conditions, distribution lists, or other data associated with the media under its control. The content provider 16 may be allowed to edit certain personal details or account details. The content provider 16 may also be permitted to upload a new media file to the system 10.

Steps 106, 108, and 110 relate to the uploading of new media to the system 10. For example, in step 106, certain metadata regarding the new media file may be received from the content provider 16, such as release conditions, artist information, title information, album information, etc. This data may be input directly by the content provider 16 or may be uploaded as a file or other document, for example a predefined XML document or form. In step 108, the content provider 16 may specify the authorized recipients of the new media file. As discussed above, the content provider 16 may select individual authorized recipients or specify the recipients by selecting one or more predefined distribution lists, or both. The selected recipients form a distribution list associated with the new media file. In step 110, the new media file is uploaded by the system 10 from the remote terminal of the content provider 16. The upload manager 34 may coordinate the uploading and storage of the new media file on the distribution server 12. Suitable encryption may be employed to ensure any of the foregoing communications and transmissions remain secure and confidential. It will be appreciated that the steps 106, 108, and 110 need not be performed in that chronological order.

Steps 112, 114, 116, and 118 reflect the process of preparing the newly uploaded media file for distribution in accordance with the present application. The steps 112, 114, 116, and 118 implement a process in which the new media file is prepared for distribution to authorized recipients on the basis of a BitTorrent distribution protocol.

In step 112, the distribution server 12 fragments the new media file by dividing the data into smaller fragments. In one embodiment, the fragments are between 64 kB and 1 MB in size. Other sizes may be used in other embodiments. A hashing algorithm is used to generate a checksum for each fragment. The checksum for each fragment may be recorded in a torrent file, which is generated in step 114. The torrent file may contain the location (URL) of the tracker 42, details regarding the number of fragments and their sizes, and checksum and/or hash code information to enable a recipient to verify the integrity of received fragments during a download. The precise contents of the torrent file may vary from implementation to implementation depending on the version of the BitTorrent protocol in use.

Once the new media file has been fragmented (step 112) and its corresponding torrent file has been generated (step 116), then the pre-seeder module 36 pre-seeds the server farm 46 with the fragments 54. In particular, each of the servers 50 is provided with a complete set of the fragments 54 that make up the media file. In one embodiment, one or more of the servers may receive an incomplete set of fragments 54; however, each server 50 is preferably provided with a complete set.

The pre-seeding operation may be implemented as a push operation by the pre-seeder module 36 in one embodiment, in which the pre-seeder module 36 pushes the fragments 54 to each of the servers 50 and the servers 50 receive and store the fragments 54 in local memory. In another embodiment, the torrent applications 52 at the servers 50 actively participate in the pre-seeding operation. For example, the torrent applications 52 may be configured to accept notice from the pre-seeder module 36 of a newly available media file for pre-seeding and may, upon receipt of such notice, request downloads of the fragments 54 from the distribution server 12. Other pre-seeding mechanisms or processes may be employed.

In addition to pre-seeding the server farm 46 with a fragmented copy of the new media file, in step 118 the distribution server 12 updates the tracker 42 with information regarding the new media file. The information supplied to the tracker 42 may include the IP addresses or other identifiers of the servers 50 that possess the media file fragments 54, and associated information regarding the media file and/or its fragments.

Following steps 110 to 118, and subject to release conditions or other such restrictions, the distribution server 12 may make the media file available for distribution to authorized recipients by making the torrent file available.

Figure 3:
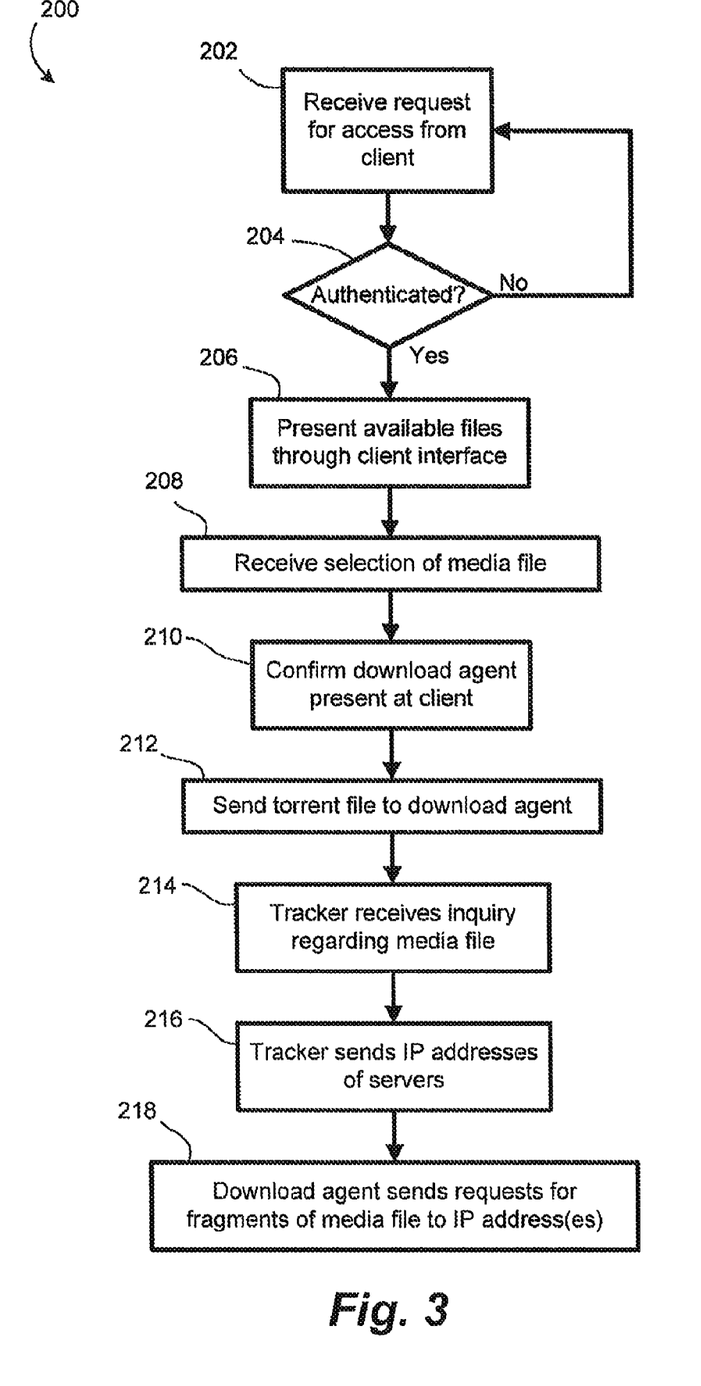
FIG. 3 shows, in flowchart form, a method for distributing a media file.

Reference is now made to FIG. 3, which shows, in flowchart form, a method 200 for distributing a media file. It will be apparent from the following description that the method 200 may be implemented, partly or wholly in software. Portions of the method 100 may be implemented by the client interface component 30, the authentication component 32, the tracker 46, the torrent applications 52, or other software elements.

The method 200 begins in step 202 with a client request for access to the distribution server 12. Receipt of the request may trigger a authentication routine to verify the identity of the requesting client as a registered user of the distribution server 12. Step 204 reflects the evaluation of user input against stored input in the authentication routine. For example, step 204 may include verifying a login name and password. It may also include a biometric evaluation, such as keystroke cadence analysis, or other such mechanisms for confirming the identity of the client. Once the client is authenticated as a registered user 18, the registered user 18 may be supplied with a session token or other such mechanism for maintaining a secure session with the distribution server 12. Various protocols exist for maintaining the security of session tokens, managing the renewal of session tokens, and otherwise ensuring that communications between an authorized client device and a server device remain secure following completion of an authorization process. Any such protocols may be employed to ensure that communications between the registered user 18 and the distribution server 12 remains secure during the session. As is outlined below, the protocol or mechanisms used may also be used to ensure that subsequent communications between the registered user 18 and the server farm 46 are similarly secure.

If the client is authenticated as a registered user 18, then in step 206 the registered user 18 is presented with a user interface, such as through a web page, indicating the operations or functions available to the registered user 18. For example, the registered user 18 may be presented with a list of media files available for download. The list may be restricted to media files for which the registered user 18 is an authorized recipient as indicated by the distribution list associated with each media file. In some embodiments, the registered user 18 may be permitted to preview a media file before deciding to download the complete file, such as by streaming a sample portion of the video or audio.

In step 208, the distribution server 12 receives a request to download a particular media file from the registered user 18. This request may be received, for example, by selection of a media file listed as available for download in the user interface or selection of a download icon or button associated with the media file. Upon receipt of the download request from the registered user 18, the distribution server 12 initiates a download process to send the media file to the registered user 18. The download process includes initiating a process involving a BitTorrent protocol for sending the selected media file to the registered user 18.

The download process may include determining whether the registered user has a download agent 40, as shown in step 210. In the event that the registered user does not have the download agent 40, the agent may be transferred from the distribution server 12 to the registered user 18; perhaps as a software update or patch to existing code at the registered user 18. The update or patch may be configured to launch on arrival at the registered user and perform an installation process, following which the download agent 40 is properly installed and configured at the registered user 18. The step 210 of confirming that the download agent 40 is installed and available on the registered user 18 may include a step of validating the download agent 40 as legitimate.

In step 212, the torrent file 56 associated with the selected media file is transmitted to the registered user 18 and, in particular, to the download agent 40. From the torrent file 56, the download agent 40 may obtain the address or URL of the tracker 42. The download agent 40 may also obtain details regarding the fragments 54 that make up the media file.

In step 214, the tracker 42 receives a request from the download agent 40 for the identities of peer devices having fragments of the media file. The tracker 42 responds in step 216 by identifying the IP addresses associated with the servers 50 in the server farm 46. Each server 50 may have multiple IP addresses, in which case the response sent by the tracker 42 includes each of the multiple IP addresses.

In step 218, the download agent 40 begins to generate fragment requests in accordance with the BitTorrent protocol. The download agent 40 may request the fragments in sequential order, in random order, or in some order determined through an algorithm, perhaps aided by information from the tracker. The version of the BitTorrent protocol used by the download agent 40 may determine the order or ordering algorithm used. In any event, the download agent 40 sends requests for the fragments to one or more of the IP addresses for the servers 50 on the server farm 46. The IP address to which the download agent 40 sends any particular request for a fragment may depend, in part, upon the loading of the associated server 50, which may be known to the download agent 40 based on data provided by the server 50 to the download agent 40. In one embodiment, the download agent 40 may be configured to evenly spread its requests for file fragments across the IP addresses. Other mechanisms for dealing with load balancing of the fragment requests across the servers 50 to ensure maximum download speed will be appreciated by those ordinarily skilled in the art.

As noted above, the firewall or access control module 44 ensures that incoming requests for fragments 54 originate from an authorized registered user 18. The incoming requests contain information identifying the sender, such as session token and sender IP address. Other identifying information may also be included. The access control module 44 possesses information against which it can authenticate incoming requests to ensure they originate from download agents 40 that have been authenticated by the distribution server 12. For example, the incoming request may be required to have a session token that corresponds to the sender's IP address in order to be deemed as authentic. Other mechanisms for ensuring the authenticity of incoming requests will be appreciated by those skilled in the art.

Step 218 continues until all fragments 54 of the media file are received by the download agent 40, following which the download agent 40 rebuilds the media file from the fragments 54. At this stage, the download agent 40 or an associated software module may perform additional processing of the media file at the registered user 18. For example, the media file may be watermarked, or other digital rights management processes may be applied to the media file. In some embodiments, the fragments of the media file are reassembled to create an encrypted media file, which is then decrypted by the registered user 18. In another embodiment, the fragments themselves or the data within each fragment may be encrypted and the registered user 18 may decrypt the fragments prior to re-assembly of the media file.

Certain adaptations and modifications of the invention will be obvious to those skilled in the art when considered in light of this description. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for distributing a media file to a client over a computer network, the client having a download agent and being configured to request access to the media file over the computer network, the system comprising:
   a distribution server for receiving the request from the client and for authenticating the client, wherein the distribution server is configured to provide the download agent with a torrent file associated with the media file provided the client has been authenticated;
   a server farm containing a plurality of servers each having at least one IP address and each having been pre-seeded with a complete copy of the media file, which is stored on each of the servers; and
   an access control module between the server farm and the computer network and configured to restrict access to the plurality of servers to download agents associated with clients authenticated by the distribution server,
   wherein each of the plurality of servers includes a torrent application configured to receive a download request via its at least one IP address from the download agent and configured to transmit at least a fragment of the media file to the download agent in response to the download request.

2. The system claimed in claim 1, wherein said distribution server is configured to receive the media file from a content provider over the computer network, and wherein said distribution server includes a pre-seeding module configured to distribute the media file to the plurality of servers within the server farm.

3. The system claimed in claim 1, wherein said distribution server is configured to fragment the media file in accordance with a BitTorrent protocol to generate a plurality of fragments, and wherein the distribution server includes a pre-seeding module configured to transmit the plurality of fragments to the plurality of servers within the server farm.

4. The system claimed in claim 3, wherein the torrent application at each server is configured to receive and store the plurality of fragments, and wherein each of the plurality of servers includes a complete copy of the plurality of fragments.

5. The system claimed in claim 3, wherein said distribution server is configured to generate the torrent file during fragmentation of the media file, and wherein the torrent file contains information regarding the plurality of fragments of the media file.

6. The system claimed in claim 1, further comprising a tracker having an address and storing data regarding the IP addresses of the plurality of servers, wherein the torrent file includes data identifying the address of the tracker, and wherein the tracker is configured to receive an inquiry from the download agent regarding the media file and to respond to the inquiry by providing the download agent with said IP addresses.

7. The system claimed in claim 1, wherein the download agent, the torrent file, and the torrent applications are configured to operate in accordance with a BitTorrent protocol.

8. The system claimed in claim 1, wherein said distribution server includes an authentication component for verifying the identity of the client and the client's inclusion in a distribution list associated with the media file, and wherein said authentication component is configured to generate authentication data for maintaining a session between said distribution server and the client, and wherein said authentication component is configured to supply said authentication data to said access control module.

9. The system claimed in claim 8, wherein said access control module is configured to authenticate the download request received from the download agent using said authentication data.

10. A method of distributing a media file to a client from a server farm via a computer network, the client having a download agent and being configured to request access to the media file over the computer network, the server farm containing a plurality of servers each having at least one IP address and each having a torrent application configured to receive a download request via its at least one IP address, an access control module being situated between the server farm and the computer network, the method comprising steps of:
- pre-seeding each of the plurality of servers with a complete copy of the media file;
- receiving the request for access from the client at a distribution server;
- authenticating the client as an authorized client entitled to have access to the media file;
- sending the download agent of the authorized client a torrent file associated with the media file if the client has been authenticated;
- receiving a download request from the download agent through its at least IP address at the access control module;
- providing that the client has been authenticated, passing the download request from the access control module to one of the content servers; and
- transmitting at least a fragment of the media file to the download agent in response to the download request.

11. The method claimed in claim 10, further including a step of receiving the media file from a content provider over the computer network prior to the step of pre-seeding.

12. The method claimed in claim 10, wherein the step of pre-seeding includes fragmenting the media file in accordance with a BitTorrent protocol to generate a plurality of fragments and transmitting the plurality of fragments to the plurality of servers within the server farm.

13. The method claimed in claim 12, wherein the step of pre-seeding further includes receiving and storing the plurality of fragments at each of the plurality of servers, thereby providing each of the plurality of servers with a complete copy of the plurality of fragments.

14. The method claimed in claim 12, wherein the step of pre-seeding further includes a step of generating the torrent file, and wherein the torrent file contains information regarding the plurality of fragments of the media file.

15. The method claimed in claim 10, further including steps of providing a tracker with the IP addresses of the plurality of servers, receiving an inquiry to the tracker from the download agent regarding the media file, and responding to the inquiry by providing the download agent with the IP addresses from the tracker.

16. The method claimed in claim 10, wherein the torrent file, the download agent, and the torrent applications are configured to operate in accordance with a BitTorrent protocol.

17. The method claimed in claim 10, wherein an access control module between the server farm and the computer network regulates access to the server farm, and wherein the step of receiving a download request includes the access control module verifying that the download agent sending the download request is associated with a client authenticated by the distribution server.

18. The method claimed in claim 17, wherein the step of authenticating includes generating authentication data for maintaining a session between the client and the distribution server, and supplying said authentication data to said access control module to perform said step of verifying.

19. A computer-readable medium containing computer-readable instructions for distributing a media file to a client from a server farm via a computer network, the client having a download agent and being configured to request access to the media file over the computer network, the server farm containing a plurality of servers each having at least one IP address and each having a torrent application configured to receive a download request via its at least one IP address, an access control module being situated between the server farm and the computer network, the computer readable instructions comprising:
- instructions for pre-seeding each of the plurality of servers with a complete copy of the media file;
- instructions for receiving the request for access from the client at a distribution server;
- instructions for authenticating the client as an authorized client entitled to have access to the media file;
- instructions for sending the download agent of the authorized client a torrent file associated with the media file if the client has been authenticated;
- instructions for receiving a download request from the download agent the access control module;
- instructions for passing the download request from the access control module to one of the content servers through its at least one IP address, providing the client has been authenticated; and
- instructions for transmitting at least a fragment of the media file to the download agent in response to the download request, wherein the computer-readable medium is non-transitory.

* * * * *